(12) United States Patent
Henry (10) Patent No.: US 10,197,427 B2
(45) Date of Patent: Feb. 5, 2019

(54) METER ROLLER FOR AN AGRICULTURAL METERING SYSTEM

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 153 days.

(21) Appl. No.: 14/924,097

(22) Filed: Oct. 27, 2015

(65) Prior Publication Data
US 2016/0120109 A1 May 5, 2016

Related U.S. Application Data (60) Provisional application No. 62/074,857, filed on Nov. 4, 2014.

(51) Int. Cl.
| | | |
|---|---|---|
| *A01C 7/12* | (2006.01) | |
| *A01C 7/08* | (2006.01) | |
| *G01F 13/00* | (2006.01) | |

(52) U.S. Cl.
CPC .......... *G01F 13/001* (2013.01); *A01C 7/127* (2013.01); *G01F 13/005* (2013.01); *A01C 7/081* (2013.01)

(58) Field of Classification Search
CPC ......... A01C 7/126; A01C 7/124; A01C 7/127; A01C 15/001; A01C 7/12; A01C 7/08; A01C 7/00; A01C 7/7081; G01F 13/001; G01F 13/00; G01F 13/005
USPC ........ 111/177, 178, 171, 170; 222/139, 273, 222/412
See application file for complete search history.

(56) References Cited

U.S. PATENT DOCUMENTS

| | | | | |
|---|---|---|---|---|
| 3,954,204 A | * | 5/1976 | Becker ................... | A01C 7/12 221/211 |
| 4,705,220 A | * | 11/1987 | Gandrud ................ | A01C 7/123 111/77 |
| 5,944,233 A | * | 8/1999 | Bourne ................. | G01F 13/001 222/272 |
| 6,112,679 A | | 9/2000 | Borstmayer et al. | |

(Continued)

FOREIGN PATENT DOCUMENTS

DE    102008013162 A1 *  9/2009  ............. A01C 7/123

OTHER PUBLICATIONS

Maleki et al., "Evaluation of Seed Distribution Uniformity of a Multi-flight Auger as a Grain Drill Metering Device," Biosystems Engineering, 2006, pp. 535-543, vol. 94, Issue 4, Elsevier Ltd.

*Primary Examiner* — Christopher J. Novosad
(74) *Attorney, Agent, or Firm* — Rebecca L. Henkel; Rickard K. DeMille (57) ABSTRACT

A meter roller for an agricultural metering system includes a first segment having a first set of flutes and a corresponding first set of recesses. The meter roller also includes a second segment having a second set of flutes and a corresponding second set of recesses. A first aggregate volume of the first set of recesses is substantially equal to a second aggregate volume of the second set of recesses, and a first longitudinal end of the first segment contacts a second longitudinal end of the second segment along a contact surface. In addition, the second segment is circumferentially offset from the first segment such that each flute of the first set of flutes is at least partially aligned with each recess of the second set of recesses at the contact surface.

20 Claims, 4 Drawing Sheets

(56) References Cited

U.S. PATENT DOCUMENTS

| | | | |
|---|---|---|---|
| 6,148,748 A | 11/2000 | Bardi et al. | |
| 6,158,630 A * | 12/2000 | Mayerle | G01F 13/001 222/413 |
| 7,083,069 B2 * | 8/2006 | Wysong | A01C 7/126 222/129 |
| 7,305,925 B2 * | 12/2007 | Pleyer | A01C 7/081 111/175 |
| 8,166,895 B2 | 5/2012 | Dean et al. | |
| 8,434,416 B2 | 5/2013 | Kowalchuk et al. | |
| 8,915,200 B2 * | 12/2014 | Barsi | A01C 7/081 111/178 |
| 2013/0085598 A1 | 4/2013 | Kowalchuk | |

* cited by examiner

METER ROLLER FOR AN AGRICULTURAL METERING SYSTEM

CROSS-REFERENCE TO RELATED APPLICATION

This application claims priority from and the benefit of U.S. Provisional Application Ser. No. 62/074,857, entitled "METER ROLLER FOR AN AGRICULTURAL METERING SYSTEM", filed Nov. 4, 2014, which is hereby incorporated by reference in its entirety.

BACKGROUND

The invention relates generally to a meter roller for an agricultural metering system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/seed tube is followed by closing discs that move displaced soil back into the trench and/or a packer wheel that packs the soil on top of the deposited seeds.

In certain configurations, an air cart is used to meter and deliver agricultural product (e.g., seeds, fertilizer, etc.) to the row units of the seeding implement. The air cart generally includes a storage tank (e.g., a pressurized tank), an air source (e.g., a blower), and a metering assembly. The product is typically gravity fed from the storage tank to the metering assembly which distributes a desired volume of product into an air flow generated by the air source. The air flow carries the product to the row units via conduits extending between the air cart and the seeding implement. The metering assembly typically includes meter rollers that regulate the flow of product based on meter roller geometry and rotation rate. For example, certain meter rollers include flutes and recesses that extend along a spiral path from a first longitudinal end of the meter roller to a second longitudinal end of the meter roller. Unfortunately, air from the pressurized tank may flow along the spiral recesses of the meter roller, thereby driving product toward one of the longitudinal ends (e.g., a downstream longitudinal end). As a result, product distribution along the length of the meter roller may be uneven, which may cause an uneven distribution of product to the row units (e.g., a row unit that receives product from a meter roller closer to the downstream longitudinal end may receive more product than a row unit that receives product from a meter roller farther from the downstream longitudinal end).

BRIEF DESCRIPTION

In one embodiment, a meter roller for an agricultural metering system includes a first segment having a first set of flutes and a corresponding first set of recesses. A first pitch of each flute of the first set of flutes relative to a rotational axis of the meter roller is greater than about 1 degree. The meter roller also includes a second segment having a second set of flutes and a corresponding second set of recesses. A second pitch of each flute of the second set of flutes relative to the rotational axis of the meter roller is substantially equal to the first pitch. Furthermore, a first aggregate volume of the first set of recesses is substantially equal to a second aggregate volume of the second set of recesses, and a first longitudinal end of the first segment contacts a second longitudinal end of the second segment along a contact surface. In addition, the second segment is circumferentially offset from the first segment such that each flute of the first set of flutes is at least partially aligned with each recess of the second set of recesses at the contact surface.

In another embodiment, a meter roller for an agricultural metering system includes a first segment having a first set of flutes and a corresponding first set of recesses. Each flute of the first set of flutes and each recess of the first set of recesses helically twist about a rotational axis of the meter roller from a first longitudinal end of the first segment to a second longitudinal end of the first segment. In addition, the meter roller includes a second segment having a second set of flutes and a corresponding second set of recesses. Each flute of the second set of flutes and each recess of the second set of recesses helically twist about the rotational axis of the meter roller from a first longitudinal end of the second segment to a second longitudinal end of the second segment. Furthermore, a first aggregate volume of the first set of recesses is substantially equal to a second aggregate volume of the second set of recesses, and the second longitudinal end of the first segment contacts the first longitudinal end of the second segment along a contact surface. In addition, the second segment is circumferentially offset from the first segment such that each flute of the first set of flutes is at least partially aligned with each recess of the second set of recesses at the contact surface.

In a further embodiment, a meter roller for an agricultural metering system includes multiple segments. Each segment includes multiple flutes and corresponding recesses, and each flute and each recess helically twist about a rotational axis of the meter roller from a first longitudinal end of a respective segment to a second longitudinal end of the respective segment. The recesses of each segment establish a respective aggregate volume, and the aggregate volumes of the segments are substantially equal to one another. In addition, the first longitudinal end of at least one segment contacts the second longitudinal end of at least one other segment along a contact surface, and the at least one segment is circumferentially offset from the at least one other segment such that each flute of the at least one segment is at least partially aligned with each recess of the at least one other segment at the contact surface.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
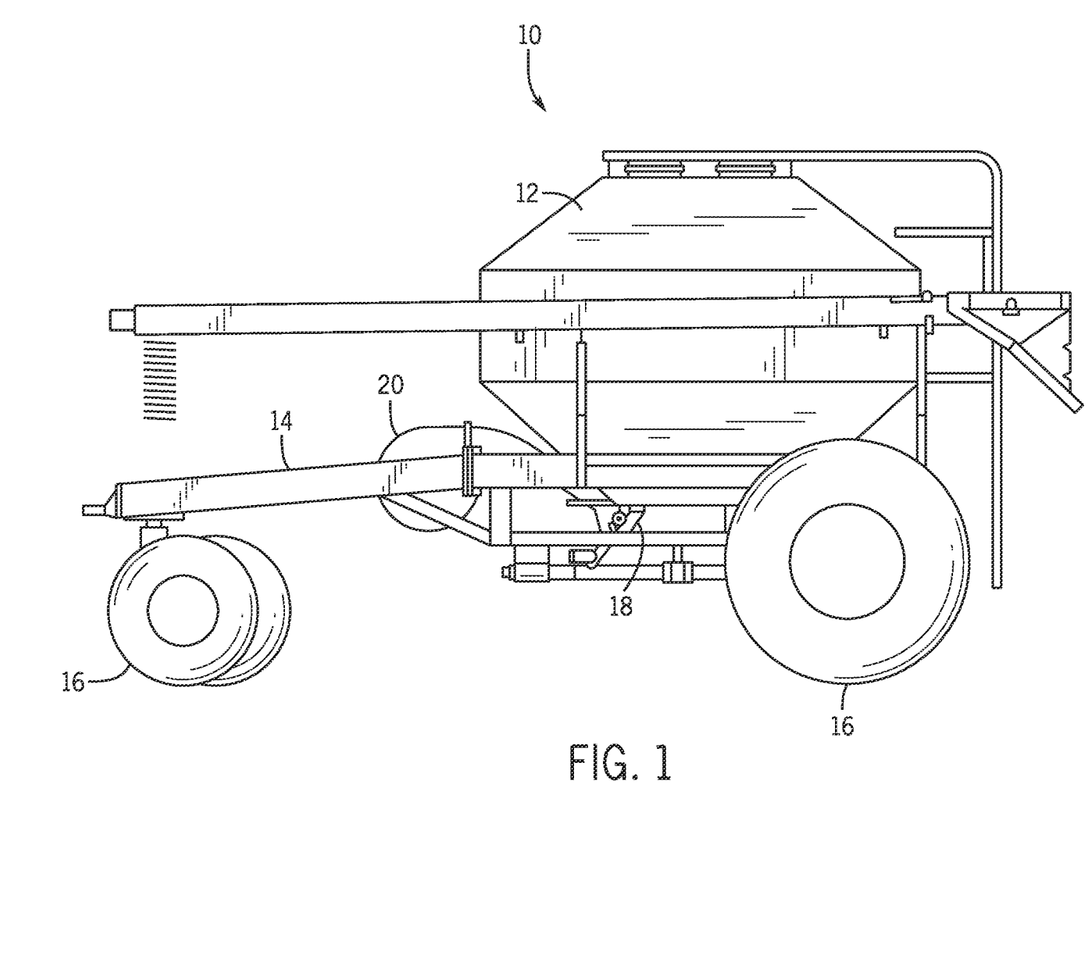
FIG. 1 is a side view of an embodiment of an air cart, including a metering system configured to regulate a flow of particulate material.

Turning now to the drawings, FIG. 1 is a side view of an air cart 10 that may be used in conjunction with a towable agricultural implement to deposit seeds into the soil. For example, certain agricultural implements include row units configured to open the soil, dispense seeds into the soil opening, and re-close the soil in a single operation. Such implements are generally coupled to a tow vehicle, such as a tractor, and pulled through a field. In certain configurations, seeds are conveyed to the row units by the illustrated air cart 10, which is generally towed in sequence with the implement. In alternative configurations, the air cart 10 may be configured to provide fertilizer to the row units, or a combination of seeds and fertilizer.

In the illustrated embodiment, the air cart 10 includes a storage tank 12, a frame 14, wheels 16, a metering assembly 18 and an air source 20. In certain configurations, the storage tank 12 includes multiple compartments for storing various flowable particulate materials. For example, one compartment may include seeds, such as canola or mustard, and another compartment may include a dry fertilizer. In such configurations, the air cart 10 is configured to delivery both the seeds and fertilizer to the implement. The frame 14 includes a towing hitch configured to couple to the implement or tow vehicle. As discussed in detail below, seeds and/or fertilizer within the storage tank 12 are gravity fed into the metering assembly 18. The metering assembly 18 includes one or more meter rollers that regulate the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
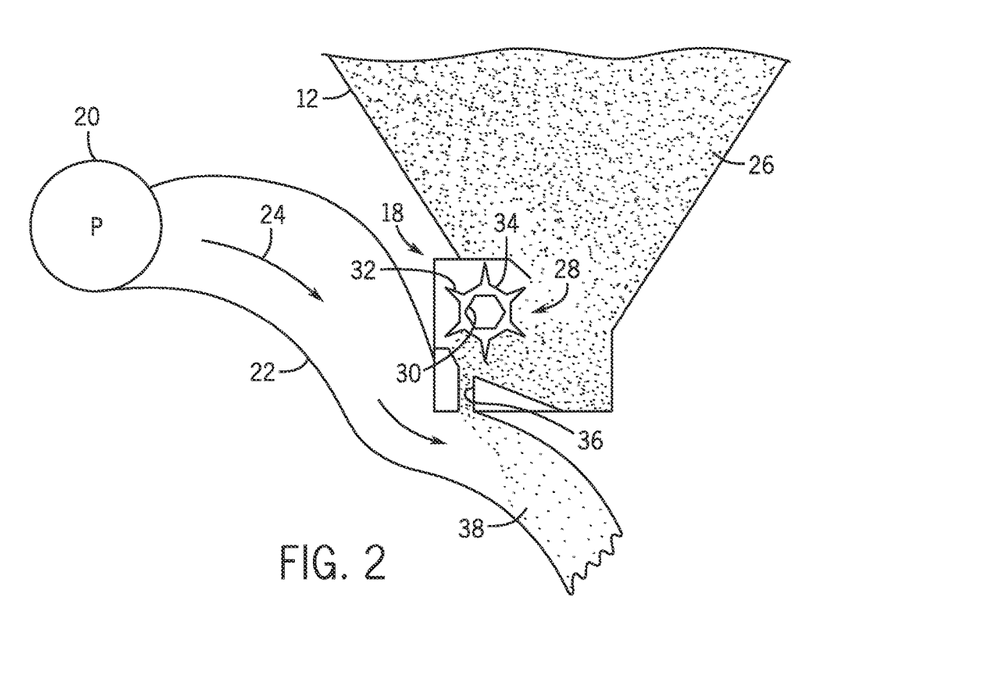
FIG. 2 is a schematic view of an embodiment of a metering system that may be employed within the air cart of FIG. 1.

FIG. 2 is a schematic view of the metering assembly 18, as shown in FIG. 1. As illustrated, the air source 20 is coupled to a conduit 22 configured to flow air 24 past the metering assembly 18. The air source 20 may be a pump or blower powered by an electric or hydraulic motor, for example. Flowable particulate material 26 (e.g., seeds, fertilizer, etc.) within the storage tank 12 flows by gravity into the metering assembly 18. In certain embodiments, the storage tank 12 is pressurized such that a static pressure in the tank 12 is greater than a static pressure in the conduit 22, thereby facilitating an even flow of material through the metering assembly 18. The metering assembly 18 includes one or more meter rollers 28 configured to regulate the flow of material 26 into the air flow 24. In addition, each meter roller 28 may include multiple meter roller segments disposed adjacent to one another along a longitudinal axis of the meter roller 28. For example, certain meter rollers 28 include nine meter roller segments. Such meter rollers are known as "9-run" meter rollers. However, in alternative embodiments, the meter roller 28 may include more or fewer segments, e.g., 5, 6, 7, 8, 9, 11, or more. In certain embodiments, each meter roller segment is configured to provide material to a respective row unit or group of row units of the agricultural implement. In such embodiments, the air cart includes multiple conduits 22, each configured to convey material from a respective meter roller segment toward one or more row units of the implement.

Each segment of the meter roller 28 includes an interior cavity 30 configured to receive a shaft that drives the segments to rotate. In the present embodiment, the cavity 30 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter roller 28. Alternatively, the meter roller 28 may be coupled to a wheel 16 by a gear assembly such that rotation of the wheel 16 drives the meter roller 28 to rotate. Such a configuration automatically varies the rotation rate of the meter roller 28 based on the speed of the air cart 10.

Each segment of the meter roller 28 also includes multiple flutes 32 and recesses 34. The number and geometry of the flutes 32 are particularly configured to accommodate the material 26 being distributed. The illustrated meter roller segment includes six flutes 32 and a corresponding number of recesses 34. Alternative embodiments may include more or fewer flutes 32 and/or recesses 34. For example, the meter roller 28 may include segments having 2, 4, 6, 8, 10, 12, 14, 16, 18, 20, or more flutes 32 and/or recesses 34. In addition, the depth of the recesses 34 and/or the height of the flutes 32 are configured to accommodate the material 26 within the storage tank 12. For example, a meter roller segment having deeper recesses 34 and fewer flutes 32 may be employed for larger seeds, while a meter roller segment having shallower recesses 34 and more flutes 32 may be employed for smaller seeds. Other parameters such as flute pitch (i.e., angle of the flute relative to a longitudinal/rotational axis) and flute angle (i.e., angle of the flute relative to a radial axis) may also be particularly selected to accommodate the material 26.

For a particular meter roller configuration, the rotation rate of the meter roller 28 controls the flow of material 26 from each segment of the meter roller into the air stream 24. For example, as the meter roller 28 rotates, each segment transfers material through an opening 36 in the metering assembly 18 into a respective conduit 22 (e.g., into a conduit associated with a respective meter roller segment). The material then mixes with air from the air source 20, thereby forming an air/material mixture 38. The mixture then flows to the respective row unit(s) of the implement via pneumatic conduits, where the seeds and/or fertilizer are deposited within the soil.

Certain meter rollers include segments having flutes and recesses that are angled relative to the rotational axis of the meter roller and/or that helically twist about the rotational axis of the meter roller from a first longitudinal end of each segment to a second longitudinal end of the segment. When such segments are disposed onto a shaft to form the meter roller, the recesses establish a substantially spiral path that extends along a length of the meter roller. Unfortunately, air from the pressurized tank may flow along the spiral path, thereby driving material/product toward one of the longitudinal ends (e.g., a downstream longitudinal end). As a result, product distribution along the length of the meter roller may be uneven, which may cause an uneven distribution of seeds and/or fertilizer to the row units (e.g., a row unit that receives product from a meter roller closer to the downstream longitudinal end may receive more product than a row unit that receives product from a meter roller farther from the downstream longitudinal end).

As discussed in detail below, the meter roller of certain embodiments disclosed herein includes circumferentially offset segments configured to reduce product flow along the length of the meter roller. For example, in certain embodiments, each segment of the meter roller includes multiple flutes and corresponding recesses. A first longitudinal end of at least one segment contacts a second longitudinal end of at least one other segment along a contact surface. In addition, the at least one segment is circumferentially offset from the at least one other segment such that each flute of the at least one segment is at least partially aligned with each recess of the at least one other segment at the contact surface. Because the flutes of one segment are at least partially aligned with the recesses of another directly adjacent segment, air flow along the path of the recesses from one segment to the directly adjacent segment is at least partially blocked. As a result, product flow between directly adjacent segments is substantially reduced, thereby increasing the uniformity of product distribution along the length of the meter roller. Accordingly, the row units may receive a substantially equal distribution of product from the meter roller, which may enhance seed and/or fertilizer distribution throughout the field.

Figure 3:
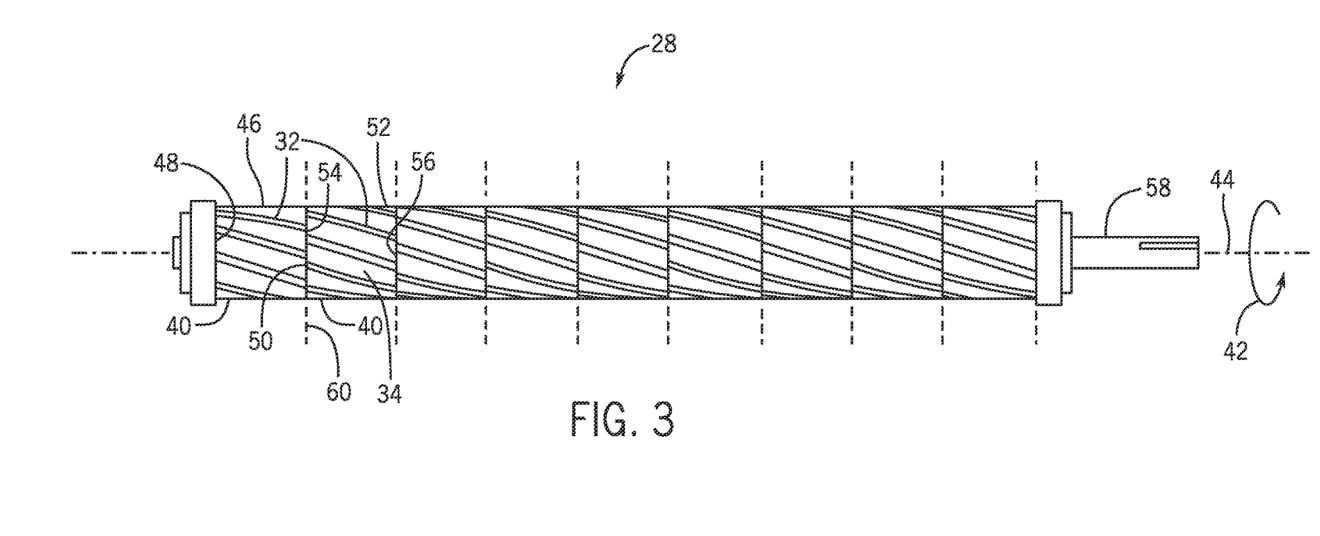
FIG. 3 is a side view of an embodiment of a meter roller that may be employed within the metering system of FIG. 2.

FIG. 3 is a side view of an embodiment of a meter roller 28 that may be employed within the metering system 18 of FIG. 2. In the illustrated embodiment, the meter roller 28 includes nine segments 40. However, as previously discussed, the meter roller 28 may include more or fewer segments. For example, in certain embodiments, the meter roller 28 may include 1, 2, 3, 4, 5, 6, 7, 8, 9, 10, 11, 12, or more segments 40. In addition, each meter roller segment 40 includes multiple flutes 32 and recesses 34 that alternate along a circumferential axis 42 of the meter roller 28. As previously discussed, each segment 40 of the meter roller 28 may include 2, 4, 6, 8, 10, 12, 14, 16, 18, 20, or more flutes 32 and/or recesses 34. In the illustrated embodiment, each flute 32 and each recess 34 helically twist about a rotational axis 44 (e.g., a longitudinal axis) of the meter roller 28. For example, each flute 32 and each recess 34 of a first segment 46 helically twist about the rotational axis 44 from a first longitudinal end 48 of the first segment 46 to a second longitudinal end 50 of the first segment 46. In addition, each flute 32 and each recess 34 of a second segment 52 helically twist about the rotational axis 44 from a first longitudinal end 54 of the second segment 52 to a second longitudinal end 56 of the second segment 52. The helical shape of the flutes 32 and the recesses 34 may provide a more even flow of particulate material into the air stream, as compared to meter roller segments that include flutes and recesses extending substantially parallel to the rotational axis. The more even flow of particular material from the meter roller 28 may provide an even distribution of seeds and/or fertilizer within the field, thereby enhancing crop development.

As the flutes 32 helically twist about the rotational axis 44, a pitch of the flutes 32 (i.e., an angle of the flutes relative to the rotational axis 44) varies along the length of each segment. For example, the pitch of the flutes 32 may continuously vary from a first longitudinal end of each segment to a second longitudinal end of the segment. In alternative embodiments, the pitch of the flutes 32 may vary in discrete increments along the length of the segment. By way of example, the flute pitch of certain segments may vary between about 1 degree to about 89 degrees, about 5 degrees to about 75 degrees, or about 10 degrees to about 60 degrees.

In the illustrated embodiment, the meter roller segments 40 have substantially equal aggregate recess volumes (e.g., the sum of the recess volumes for each segment). For example, a first aggregate volume of the recesses 34 of the first segment 46 is substantially equal to a second aggregate volume of the recesses 34 of the second segment 52. The substantially equal aggregate recess volumes are configured to establish substantially equal product flow rates from the segments 40. For example, as the segments 40 are driven to rotate by the shaft 58, the substantially equal aggregate recess volumes enable the material dispensed by the segments to be substantially equally distributed to respective row units.

As illustrated, each segment 40 is circumferentially offset from a directly adjacent segment 40. For example, the second longitudinal end 50 of the first segment 46 contacts the first longitudinal end 54 of the second segment 52 along a contact surface 60. In addition, the second segment 52 is circumferentially offset (i.e., offset along the circumferential axis 42) from the first segment 46 such that each flute 32 of the first segment 46 is at least partially aligned with each recess 34 of the second segment 52 at the contact surface 60. Similarly, each subsequent segment is circumferentially offset from a directly adjacent segment. Because the flutes of each segment are at least partially aligned with the recesses of a directly adjacent segment, air flow along the path of the recesses from one segment to the directly adjacent segment is at least partially blocked. As a result, product flow between directly adjacent segments is substantially reduced, thereby increasing the uniformity of product distribution along the length of the meter roller. Accordingly, the row units may receive a substantially equal distribution of product from the meter roller, which may enhance seed and/or fertilizer distribution throughout the field.

In certain embodiments, directly adjacent segments (e.g., the first segment 46 and the second segment 52) may be circumferentially offset from one another by about 1 degree to about 180 degrees, by about 1 degree to about 90 degrees, or by about 2 degrees to about 45 degrees, for example. By way of example, directly adjacent segments may be circumferentially offset from one another by more than 1 degree, by more than 2 degrees, by more than 5 degrees, by more than 10 degrees, by more than 15 degrees, by more than 30 degrees, by more than 45 degrees, by more than 90 degrees, or by more than 180 degrees. In certain embodiments, directly adjacent meter roller segments 40 may be circumferentially offset from one another such that a peak/center point of a flute 32 on one segment 40 is substantially aligned with a trough/center point of a recess 34 on the directly adjacent segment 40 at the contact surface 60.

In the illustrated embodiment, the contact surface 60 forms a plane extending substantially perpendicularly to the rotational axis 44. However, in alternative embodiments, the contact surface 60 may form a plane that intersects the rotational axis 44 at any suitable angle (e.g., about 30 degrees, about 45 degrees, about 75 degrees, etc.). In addition, in certain embodiments, the contact surface 60 may be non-planar. For example, the contact surface 60 of longitudinal ends of directly adjacent meter roller segments may be wavy or curved, among other shapes/configurations.

In the illustrated embodiment, the segments 40 are formed separately from one another. For example, the first segment 46 and the second segment 52 are separate and independent elements of the meter roller 28. As discussed in detail below, each segment may include an engagement feature configured to non-rotatably couple the segment 40 to the shaft 58. In such a configuration, the engagement features are oriented to circumferentially offset each segment 40 relative to the directly adjacent segment. In alternative embodiments, however, the meter roller 28 may be formed (e.g., machined) from a single piece of material. In such embodiments, the circumferentially offset segments may be formed such that each flute of one segment is at least partially aligned with each recess of an adjacent segment at the contact surface of the adjacent segments.

In the illustrated embodiment, each segment 40 of the meter roller 28 is circumferentially offset (i.e., offset along the circumferential axis 42) from one another. However, in alternative embodiments, certain segments 40 may be aligned with one another such that each flute of one segment is substantially aligned with each flute of an adjacent segment at the contact surface of the adjacent segments. For example, two segments of a first set of segments may be substantially aligned with one another, two segments of a second set of segments may be substantially aligned with one another, and the first set of segments may be circumferentially offset from the second set of segments at the contact surface of directly adjacent segments of the respective sets. In addition, other combinations of aligned and circumferentially offset segments may be employed in alternative embodiments.

Figure 4:
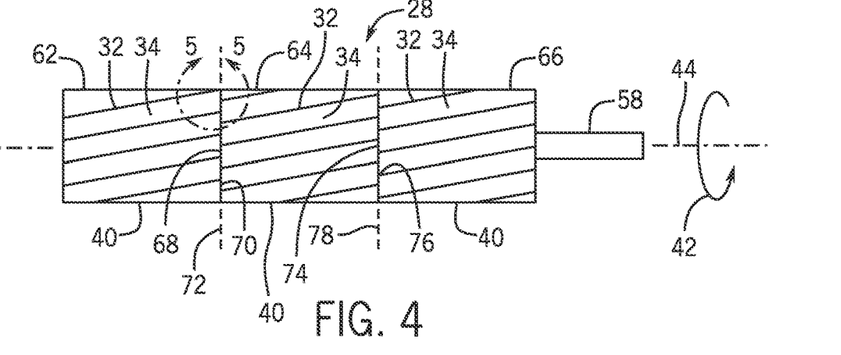
FIG. 4 is a side view of an alternative embodiment of a meter roller that may be employed within the metering system of FIG. 2.

FIG. 4 is a side view of an alternative embodiment of a meter roller 28 that may be employed within the metering system of FIG. 2. In the illustrated embodiment, the meter roller 28 includes three segments 40, each non-rotatably coupled to the shaft 58 such that rotation of the shaft 58 drives the meter roller segments 40 to rotate. While the illustrated embodiment includes three meter roller segments (i.e., a first segment 62, a second segment 64, and a third segment 66), it should be appreciated that the meter roller 28 may include more or fewer meter roller segments in alternative embodiments. As illustrated, each meter roller segment 40 includes multiple flutes 32 and corresponding recesses 34 distributed along the circumferential axis 42 (e.g., circumferentially distributed about each segment 40).

In the illustrated embodiment, the flutes 32 and the recesses 34 are substantially linear and angled relative to the rotational axis 44. For example, the angle between the flutes 32 of the first segment 62 and the rotational axis 44 is greater than zero degrees. That is, the flutes 32 of the first segment 62 have a pitch of greater than zero degrees. Similarly, the flutes 32 of the second segment 64 and the flutes 32 of the third segment 66 have a pitch of greater than zero degrees. As discussed in detail below, the pitch may be greater than about 1 degree, greater than about 2 degrees, greater than about 5 degrees, greater than about 15 degrees, greater than about 30 degrees, greater than about 45 degrees, or more. In the illustrated embodiment, the pitch of the flutes 32 of the first segment 62 is substantially equal to the pitch of the flutes 32 of the second segment 64 and the pitch of the flutes 32 of the third segment 66.

Similar to the embodiment described above with reference to FIG. 3, the meter roller segments 40 have substantially equal aggregate recess volumes (e.g., the sum of the recess volumes for each segment). For example, a first aggregate volume of the recesses 34 of the first segment 62 is substantially equal to a second aggregate volume of the recesses 34 of the second segment 64. In addition, a third aggregate volume of the recesses of the third segment 66 is substantially equal to the first aggregate volume of the recesses 34 of the first segment 62. The substantially equal aggregate recess volumes are configured to establish substantially equal product flow rates from the segments 40. For example, as the segments 40 are driven to rotate by the shaft 58, the substantially equal aggregate recess volumes enable the material dispensed by the segments to be substantially equally distributed to the respective row units.

In the illustrated embodiment, a first longitudinal end 68 of the first segment 62 contacts a second longitudinal end 70 of the second segment 64 along a first contact surface 72. In addition, a first longitudinal end 74 of the second segment 64 contacts a second longitudinal end 76 of the third segment 66 at a second contact surface 78. In the illustrated embodiment, the first contact surface 72 and the second contact surface 78 form respective planes extending substantially perpendicularly to the rotational axis 44. However, in alternative embodiments, the contact surfaces 72 and 78 may form respective planes that intersect the rotational axis 44 at any suitable angle (e.g., about 30 degrees, about 45 degrees, about 75 degrees, etc.). In addition, in certain embodiments, the contact surfaces 72 and 78 may be non-planar. For example, the contact surfaces 72 and 78 may be wavy or curved, among other shapes/configurations.

In the illustrated embodiment, the second segment 64 is circumferentially offset from the first segment 62 such that each flute 32 of the first segment 62 is at least partially aligned with each recess 34 of the second segment 64 at the first contact surface 72. In addition, the third segment 66 is circumferentially offset from the second segment 64 such that each flute 32 of the third segment 66 is at least partially aligned with each recess 34 of the second segment 64 at the second contact surface 78. Because the flutes of each segment are at least partially aligned with the recesses of a directly adjacent segment, air flow along the path of the recesses from one segment to the directly adjacent segment is at least partially blocked. As a result, product flow between directly adjacent segments is substantially reduced, thereby increasing the uniformity of product distribution along the length of the meter roller. Accordingly, the row units may receive a substantially equal distribution of product from the meter roller, which may enhance seed and/or fertilizer distribution throughout the field.

While the flutes 32 of the segments 40 are substantially linear in the illustrated embodiment, it should be appreciated that the flutes 32 may be curved in alternative embodiments. For example, the flutes 32 of each segment may helically twist about the rotational axis 44 from the first longitudinal end of the segment to the second longitudinal end of the segment. In addition, while the pitch of the flutes 32 of the first segment 62 is substantially equal to the pitch of the flutes 32 of the second segment 64 and the third segment 66, it should be appreciated that, in alternative embodiments, the flutes of the segments may have different pitches.

Figure 5:
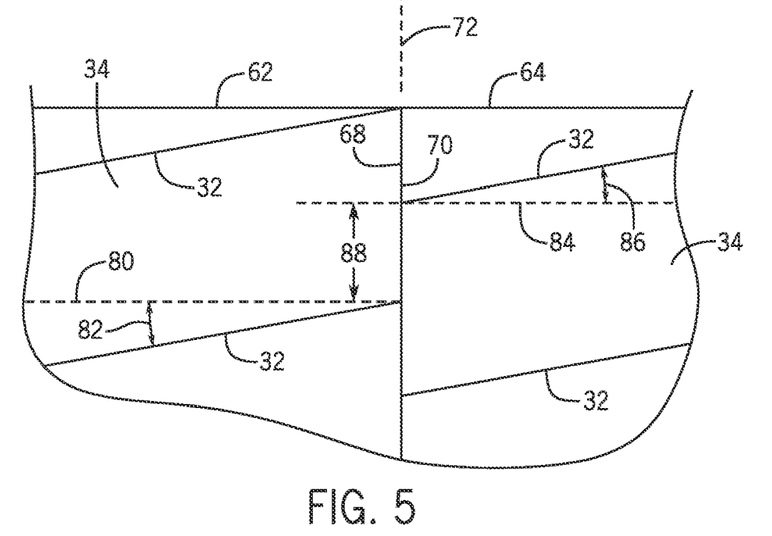
FIG. 5 is a detailed side view of the meter roller of FIG. 4, taken within line 5-5.

FIG. 5 is a detailed side view of the meter roller of FIG. 4, taken within line 5-5. As illustrated, each flute 32 of the first segment 62 is angled with respect to a first axis 80, which is substantially parallel to the rotational axis, thereby defining a first pitch 82. In addition, each flute 32 of the second segment 64 is angled relative to a second axis 84, which is substantially parallel to the rotational axis, thereby establishing a second pitch 86. In the illustrated embodiment, the first pitch 82 is substantially equal to the second pitch 86. However, in alternative embodiments, the first pitch 82 may be greater or less than the second pitch 86.

In certain embodiments, the pitch (e.g., the first pitch 82 and/or the second pitch 86) may be greater than about 1 degree, greater than about 2 degrees, greater than about 5 degrees, greater than about 10 degrees, greater than about 15 degrees, greater than about 30 degrees, greater than about 45 degrees, greater than about 60 degrees, greater than about 90 degrees, or more. By way of example, the pitch may be between about 1 to about 179 degrees, about 1 to about 90 degrees, about 1 to about 75 degrees, about 1 to about 60 degrees, about 1 to about 45 degrees, about 1 to about 30 degrees, about 5 to about 30 degrees, or about 15 to about 30 degrees.

In the illustrated embodiment, the first and second segments are circumferentially offset from one another by an offset angle 88. In certain embodiments, the offset angle 88 may be about 1 degree to about 180 degrees, about 1 degree to about 90 degrees, about 1 degree to about 60 degrees, about 1 degree to about 45 degrees, about 2 degrees to about 90 degrees, about 2 degrees to about 45 degrees, about 2 degrees to about 30 degrees, or about 2 degrees to about 15 degrees, for example. By way of example, the offset angle 88 may be greater than 1 degree, greater than 2 degrees, greater than 5 degrees, greater than 10 degrees, greater than 15 degrees, greater than 30 degrees, greater than 45 degrees, greater than 90 degrees, or greater than 180 degrees. In certain embodiments, the first and second segments may be circumferentially offset from one another such that a peak/center point of a flute 32 of the first segment 62 is substantially aligned with a trough/center point of a recess 34 of the second segment 64 at the contact surface 72. While the flute pitch and circumferential offset between directly adjacent segments are described above with reference to the first and second segments, it should be appreciated that other segments (e.g., the third segment 66) of the meter roller may include pitches and/or circumferential offsets within the described ranges.

Figure 6:
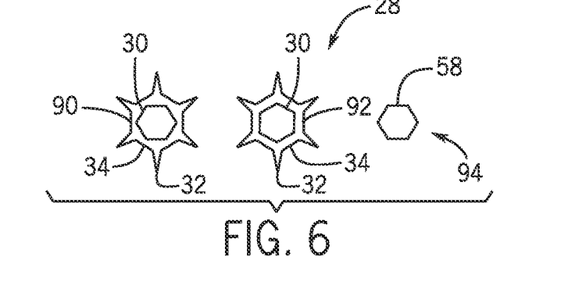
FIG. 6 is a cross-sectional view of two segments of an embodiment of a meter roller and an embodiment of a shaft configured to drive the meter roller.

FIG. 6 is a cross-sectional view of two segments (i.e., a first segment 90 and a second segment 92) of an embodiment of a meter roller 28 and an embodiment of a shaft 58 configured to drive the meter roller 28. In the illustrated embodiment, the segments 90 and 92 are formed separately from one another. Accordingly, the first segment 90 and the second segment 92 are separate and independent elements of the meter roller 28. As illustrated, each segment includes an engagement feature (e.g., the interior cavity 30) configured to receive the shaft 58 and to engage an engagement feature 94 (e.g., an outer surface profile) of the shaft 58, thereby non-rotatably coupling the segments 90 and 92 to the shaft 58. In the illustrated embodiment, the engagement feature/cavity 30 has a hexagonal cross section, thereby facilitating non-rotatable engagement with the hexagonal shaft 58. However, in alternative embodiments, each segment may include a different engagement feature, such as a different cavity configuration (e.g., triangular, square, keyed, splined, etc.). Because the engagement features non-rotatably couple the segments 90 and 92 to the shaft 58, rotation of the shaft 58 drives the segments 90 and 92 to rotate.

As illustrated, the engagement features (e.g., cavities 30) are oriented to circumferentially offset the second segment 92 relative to the first segment 90. For example, if the hexagonal cavity 30 of the second segment 92 is circumferentially offset by 30 degrees from the hexagonal cavity 30 of the first segment 90, the circumferential offset angle between the first and second segments is 30 degrees while the segments 90 and 92 are mounted to the shaft 58. Similarly, if a hexagonal cavity 30 of a third segment is circumferentially offset by 30 degrees from the hexagonal cavity 30 of the second segment 92, the circumferential offset angel between the second and third segments is 30 degrees while the segments are mounted to the shaft 58.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A meter roller for an agricultural metering system, comprising:

a first segment having a first plurality of flutes and a corresponding first plurality of recesses, wherein a first pitch of each flute of the first plurality of flutes relative to a rotational axis of the meter roller is greater than about 1 degree; and a second segment having a second plurality of flutes and a corresponding second plurality of recesses, wherein a second pitch of each flute of the second plurality of flutes relative to the rotational axis of the meter roller is substantially equal to the first pitch;

wherein a first aggregate volume of the first plurality of recesses is substantially equal to a second aggregate volume of the second plurality of recesses, a first longitudinal end of the first segment contacts a second longitudinal end of the second segment along a first contact surface, and the second segment is circumferentially offset from the first segment such that each flute of the first plurality of flutes is at least partially aligned with each recess of the second plurality of recesses at the first contact surface.

2. The meter roller of claim 1, wherein the first contact surface comprises a contact plane extending substantially perpendicular to the rotational axis.

3. The meter roller of claim 1, wherein the first pitch and the second pitch are between about 5 degrees to about 30 degrees.

4. The meter roller of claim 1, wherein the second segment is circumferentially offset from the first segment by about 2 degrees to about 45 degrees.

5. The meter roller of claim 1, wherein each flute of the first and second pluralities of flutes and each recess of the first and second pluralities of recesses helically twist about the rotational axis.

6. The meter roller of claim 1, comprising:

a third segment having a third plurality of flutes and a corresponding third plurality of recesses, wherein a third pitch of each flute of the third plurality of flutes relative to the rotational axis of the meter roller is substantially equal to the first pitch;

wherein a third aggregate volume of the third plurality of recesses is substantially equal to the first aggregate volume of the first plurality of recesses, a first longitudinal end of the second segment contacts a second longitudinal end of the third segment at a second contact surface, and the third segment is circumferentially offset from the second segment such that each flute of the third plurality of flutes is at least partially aligned with each recess of the second plurality of recesses at the second contact surface.

7. The meter roller of claim 6, wherein the second contact surface comprises a contact plane extending substantially perpendicular to the rotational axis.

8. The meter roller of claim 6, wherein the third segment is circumferentially offset from the second segment by about 2 degrees to about 45 degrees.

9. The meter roller of claim 6, wherein each flute of the third plurality of flutes and each recess of the third plurality of recesses helically twist about the rotational axis.

10. The meter roller of claim 1, comprising a shaft extending through the first and second segments, wherein the first segment includes a first engagement feature and the second segment includes a second engagement feature, the first and second engagement features engage a third engagement feature of the shaft to non-rotatably couple the first and second segments to the shaft, and the first and second engagement features are oriented to circumferentially offset the second segment relative to the first segment.

11. A meter roller for an agricultural metering system, comprising:
- a first segment having a first plurality of flutes and a corresponding first plurality of recesses, wherein each flute of the first plurality of flutes and each recess of the first plurality of recesses helically twist about a rotational axis of the meter roller from a first longitudinal end of the first segment to a second longitudinal end of the first segment; and
- a second segment having a second plurality of flutes and a corresponding second plurality of recesses, wherein each flute of the second plurality of flutes and each recess of the second plurality of recesses helically twist about the rotational axis of the meter roller from a first longitudinal end of the second segment to a second longitudinal end of the second segment;
- wherein a first aggregate volume of the first plurality of recesses is substantially equal to a second aggregate volume of the second plurality of recesses, the second longitudinal end of the first segment contacts the first longitudinal end of the second segment along a contact surface, and the second segment is circumferentially offset from the first segment such that each flute of the first plurality of flutes is at least partially aligned with each recess of the second plurality of recesses at the contact surface.

12. The meter roller of claim 11, wherein the contact surface comprises a contact plane extending substantially perpendicular to the rotational axis.

13. The meter roller of claim 11, wherein the second segment is circumferentially offset from the first segment by about 2 degrees to about 45 degrees.

14. The meter roller of claim 11, wherein the first segment is formed separately from the second segment.

15. The meter roller of claim 11, comprising a shaft extending through the first and second segments, wherein the first segment includes a first engagement feature and the second segment includes a second engagement feature, the first and second engagement features engage a third engagement feature of the shaft to non-rotatably couple the first and second segments to the shaft, and the first and second engagement features are oriented to circumferentially offset the second segment relative to the first segment.

16. A meter roller for an agricultural metering system comprising:
- a plurality of segments, wherein each segment of the plurality of segments includes a plurality of flutes and a corresponding plurality of recesses, and each flute of the plurality of flutes and each recess of the plurality of recesses helically twist about a rotational axis of the meter roller from a first longitudinal end of a respective segment to a second longitudinal end of the respective segment;
- wherein the plurality of recesses of each segment of the plurality of segments establishes a respective aggregate volume, the aggregate volumes of the plurality of segments are substantially equal to one another, the first longitudinal end of at least one segment of the plurality of segments contacts the second longitudinal end of at least one other segment of the plurality of segments along a contact surface, and the at least one segment is circumferentially offset from the at least one other segment such that each flute of the plurality of flutes of the at least one segment is at least partially aligned with each recess of the plurality of recesses of the at least one other segment at the contact surface.

17. The meter roller of claim 16, wherein the at least one segment of the plurality of segments is circumferentially offset from the at least one other segment of the plurality of segments by about 2 degrees to about 45 degrees.

18. The meter roller of claim 16, wherein each flute of the plurality of flutes of each segment of the plurality of segments is oriented at a pitch relative to the rotational axis of the meter roller, and the pitch is greater than about 1 degree.

19. The meter roller of claim 16, wherein each of the plurality of segments is separately formed.

20. The meter roller of claim 16, comprising a shaft extending through the plurality of segments, wherein each segment includes a respective first engagement feature, the respective first engagement features engage a second engagement feature of the shaft to non-rotatably couple the plurality of segments to the shaft, and the first engagement features are oriented to circumferentially offset the at least one segment relative to the at least one other segment.

* * * * *